United States Patent [19]
Tezuka et al.

[11] Patent Number: 5,459,662
[45] Date of Patent: Oct. 17, 1995

[54] SYSTEM FOR CONTROLLING OUTPUT OF AN AUTOMOTIVE ENGINE

[75] Inventors: Kazunari Tezuka, Saitama; Mitsuru Makabe, Tokyo, both of Japan

[73] Assignee: Fuji Jukogyo Kabushiki Kaisha, Tokyo, Japan

[21] Appl. No.: 249,647

[22] Filed: May 26, 1994

Related U.S. Application Data

[63] Continuation of Ser. No. 781,752, Oct. 23, 1991, abandoned.

[30] Foreign Application Priority Data

Oct. 31, 1990 [JP] Japan ..................................... 2-294387
Oct. 31, 1990 [JP] Japan ..................................... 2-294390

[51] Int. Cl.$^6$ .................................................. B60K 28/16
[52] U.S. Cl. ................. 364/426.03; 364/426.02; 180/197; 123/333; 123/481
[58] Field of Search ................... 364/426.01, 426.02, 364/426.03; 180/197; 123/333, 481, 493

[56] References Cited

U.S. PATENT DOCUMENTS

| | | | |
|---|---|---|---|
| 4,921,064 | 5/1990 | Wazaki et al. | 364/426.01 |
| 4,933,857 | 6/1990 | Hashiguchi et al. | 364/426.02 |
| 4,985,837 | 1/1991 | Togai et al. | 180/197 |
| 5,025,881 | 6/1991 | Poirier et al. | 123/481 |
| 5,038,883 | 8/1991 | Kushi et al. | 123/333 |
| 5,046,009 | 9/1991 | Abo et al. | 180/197 |
| 5,067,579 | 11/1991 | Kushi et al. | 180/197 |
| 5,099,942 | 3/1992 | Kushi et al. | 364/426.03 |
| 5,137,105 | 8/1992 | Suzuki et al. | 180/197 |
| 5,154,151 | 10/1992 | Bradshaw et al. | 180/197 |
| 5,168,952 | 12/1992 | Oono et al. | 180/197 |

FOREIGN PATENT DOCUMENTS

| | | |
|---|---|---|
| 59-68537 | 4/1984 | Japan . |
| 60-147546 | 8/1985 | Japan . |

*Primary Examiner*—Gary Chin
*Attorney, Agent, or Firm*—Martin A. Farber

[57] ABSTRACT

A first desired engine torque is obtained based on engine speed at slipping of drive wheels of a vehicle. In accordance with the engine speed, and the first desired engine torque, a second desired engine torque is calculated. In response to actual engine torque of an engine and the second desired engine torque, an engine torque reducing quantity is obtained. The number of cylinders supplied with fuel is reduced in accordance with the engine torque reducing quantity, thereby reducing the engine torque of the engine.

8 Claims, 12 Drawing Sheets

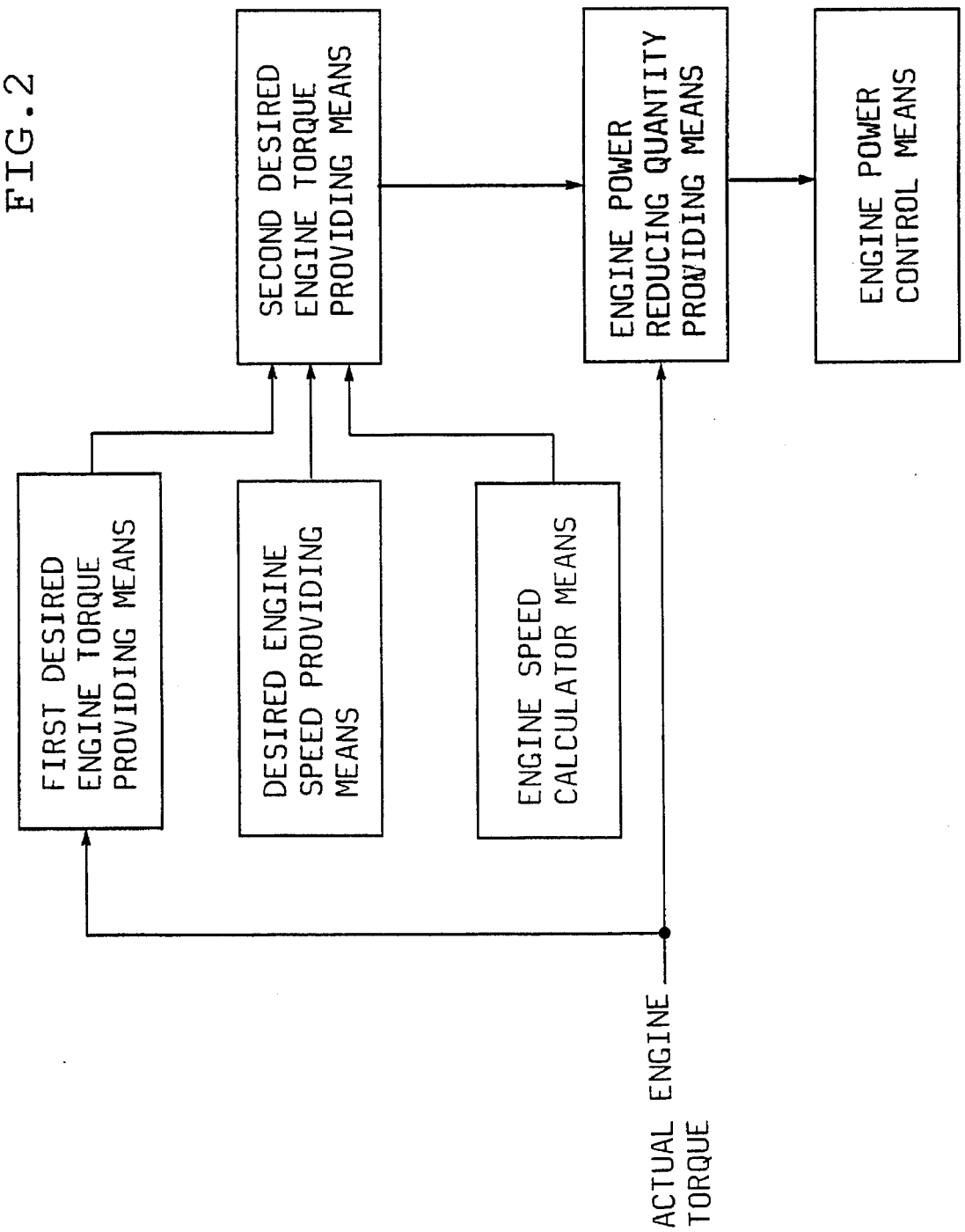

5,459,662

SYSTEM FOR CONTROLLING OUTPUT OF AN AUTOMOTIVE ENGINE

RELATED APPLICATION

This application is a continuation of our application Ser. No. 07/781,752 filed: Oct. 23, 1991 now abandoned.

BACKGROUND OF THE INVENTION

The present invention relates to a system for controlling the output of an automotive engine having a traction control system.

The traction control system is employed for improving the power of the engine at a low vehicle speed. When the tires slip on a snowy road or on a wet road at starting, the vehicle can not be driven ahead or the speed of the vehicle can not be increased. In such a state, the power of the engine is effectively used by the traction control. And, the traction control is used for preventing sudden spinning of the tire while keeping steerability in order to ensure safe driving in the entire range of vehicle speed.

There have been proposed various kinds of traction control systems, and some have to reduce engine torque at a low vehicle speed, or the other systems are controlled only by braking operations.

Japanese Patent Application Laid-open 59-68537 discloses a traction control system in which engine power is controlled in accordance with slipping of wheels. Japanese Patent Application Laid-open 60-147546 discloses a system in which a limit drive torque is calculated in accordance with the friction coefficient between the road surface and wheels, and the load against the ground. The engine is controlled so as to obtain the calculated torque.

In the former system, the power of the engine is controlled by a feedback control system responsive to a slip ratio. Such a feedback system is subject to a delay in response, which causes vehicle speed to fluctuate.

In the latter system, it is necessary to detect the load against the ground and the friction coefficient between the road surface and the wheels in order to calculate the torque. However, since the load is a dynamic load during driving the vehicle and the condition of the road surface always varies, it is difficult to detect the load and friction coefficient with accuracy.

SUMMARY OF THE INVENTION

An object of the present invention is to provide a control system of an engine output which may prevent slipping of wheels, thereby effectively producing torque of an engine without using a particular detecting system.

In accordance with the present invention, the system comprises first desired engine torque providing means applied with an actual engine torque at slipping of the drive wheels for determining a first desired engine torque, engine speed calculator means for calculating an engine speed, and desired engine speed providing means for determining a desired engine speed. These signals are applied to second desired engine torque providing means for determining a second desired engine torque. The second desired engine torque is applied to engine power reducing quantity providing means to which the actual engine torque is applied. In the engine power reducing quantity providing means, a reducing quantity of the engine power is determined in accordance with an actual engine torque and the second desired engine torque. The reducing quantity is applied to engine power control means for controlling the engine power in dependency on the reducing quantity. FIG. 2 shows the above described elements of the present invention.

In an aspect of the invention, the second desired engine torque is set based on a difference between the first desired engine torque and an amount. The amount is a value which is proportional with a difference between the desired engine speed and the actual engine torque.

The first desired engine torque is corrected by an engine speed changing rate at beginning of the slipping.

The reducing means is arranged to cut the fuel to at least one specified cylinder of the cylinders.

In accordance with the present invention, the desired engine torque is determined based on the engine torque at the slipping, and the engine power is controlled in accordance with the desired engine torque and the reducing quantity. Thus, excessive engine torque is unnecessary. Furthermore, the desired engine torque is corrected in accordance with the desired engine speed and the actual engine speed by the feedback control, and the engine speed is reduced to a speed when the wheels start slipping. Therefore, the excessive slipping is prevented to effectively distribute the power of the engine to the drive wheels.

The other objects and features of this invention will become understood from the following description with reference to the accompanying drawings.

BRIEF DESCRIPTION OF DRAWINGS

FIG. 2 is a block diagram showing a schematic block diagram of the present invention;

DETAILED DESCRIPTION OF THE PREFERRED EMBODIMENT

Figure 1:
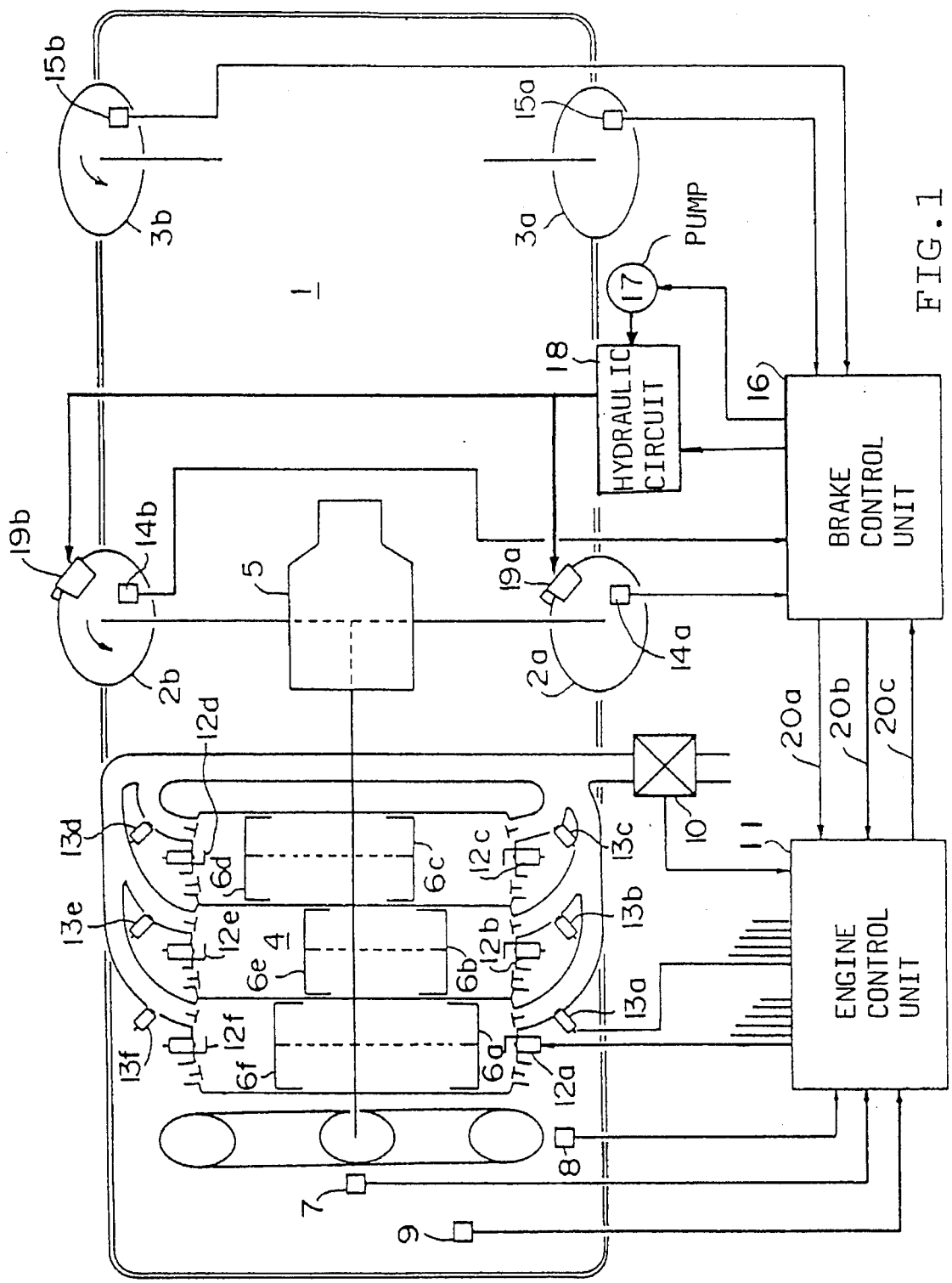
FIG. 1 is a schematic diagram showing a system according to the present invention.

Referring to FIG. 1 showing a motor vehicle 1, an engine 4 of the motor vehicle 1 has six horizontally opposed cylinders 6a to 6f. Power of the engine 4 is transmitted to a transmission 5, and further to drive (front) wheels 2a and 2b through front axles. Spark plugs 12a to 12f are provided on tops of combustion chambers of the cylinders 6a to 6f. Fuel injectors 13a to 13f are provided in an intake manifold.

The engine 4 is provided with a crank angle sensor 7, a cam angle sensor 8, and a coolant temperature sensor 9 for detecting the operations of the cylinders 6a to 6f and the operating conditions of the engine 4. An intake-air quantity sensor (air-flow meter) 10 is provided in an intake pipe.

An engine control unit 11 is applied with output signals of the sensors and produces output signals for controlling the ignition timing of the spark plugs 12a to 12f and fuel to be injected from the fuel injectors 13a to 13f.

A pair of drive-wheel speed sensors 14a and 14b are provided adjacent the axles of the drive (front) wheels 2a and 2b, and a pair of driven-wheel speed sensors 15a and 15b are provided adjacent the axles of driven (rear) wheels 3a and 3b. The speed sensor comprises a gear attached to the axle, and an electromagnetic pick-up detecting teeth of the gear.

Output signals of the speed sensors are applied to a brake control unit 16 which detects slipping of the drive wheels 2a and 2b and produces a signal for controlling the braking of the motor vehicle, thereby preventing the slipping of the drive wheels 2a, 2b. A brake control signal is applied to a hydraulic circuit 18. The hydraulic circuit 18 supplied with oil from an oil pump 17 is connected to brake pads 19a and 19b of the brake system provided on the drive wheels 2a and 2b. The hydraulic circuit 18 hydraulically operates the brake pads 19a and 19b responsive to the brake control signal of the control unit 16, thereby preventing the slipping of the drive wheels.

The output signals of the brake control unit 16 are fed to the engine control unit 11 through signal leads 20a and 20b, and a monitor signal from the engine control unit 11 is supplied to the brake control unit 16 through a signal lead 20c.

Figure 3A:
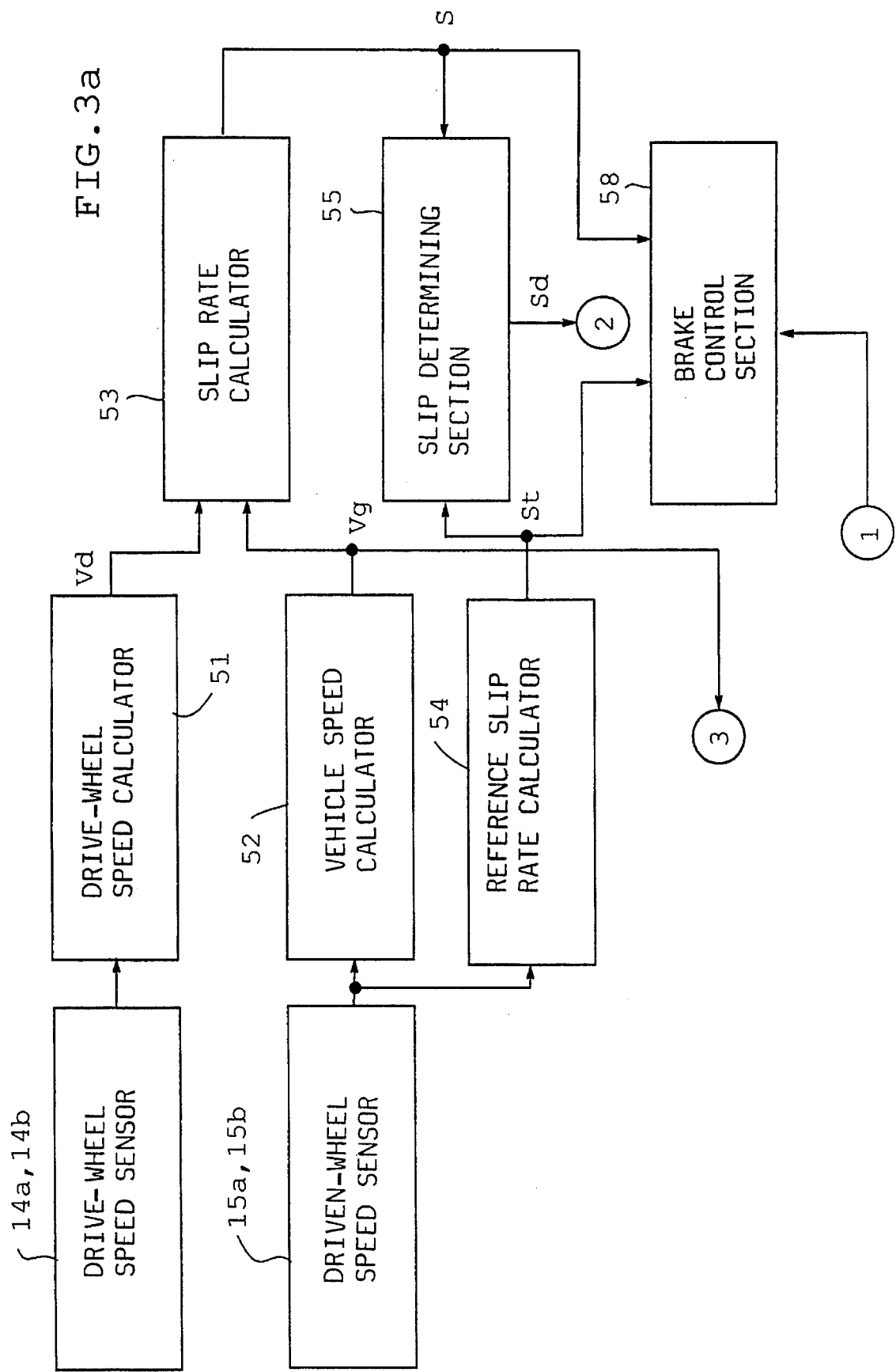
FIGS. 3a and 3b are block diagrams of a brake control unit in the system of the present invention.
Figure 3B:
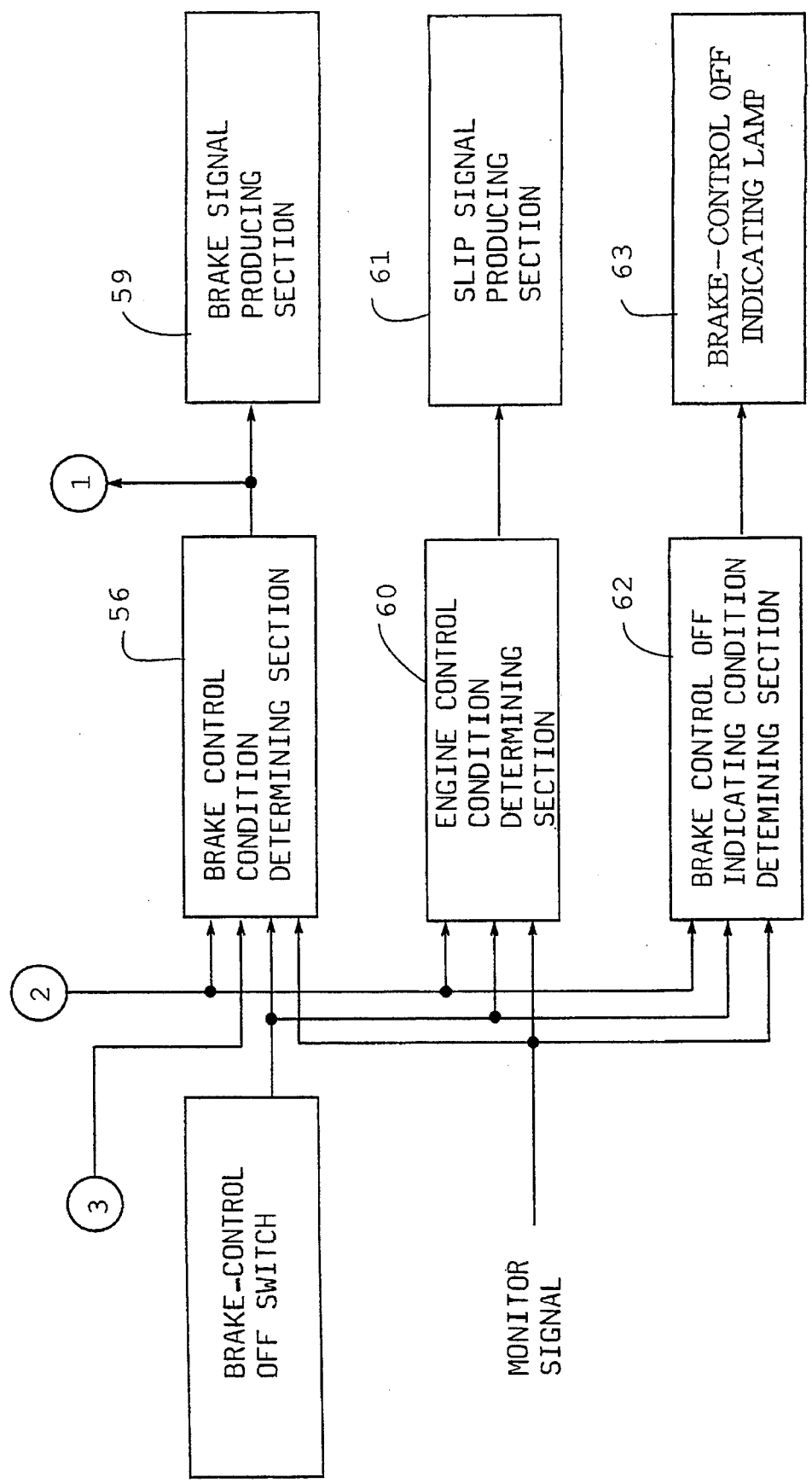

Referring to FIGS. 3a, 3b, the brake control unit 16 comprises a drive-wheel speed calculator 51 to which drive-wheel speeds from the left and right drive-wheel speed sensors 14a and 14b are applied, and a vehicle speed (ground speed) calculator 52 to which driven-wheel speeds from the left and right driven-wheel speed sensors 15a and 15b are applied. The drive-wheel speed calculator 51 calculates a drive-wheel speed Vd. The vehicle speed calculator 52 calculates a vehicle speed (ground speed) Vg. The drive-wheel speed Vd and the vehicle speed Vg are applied to a slip rate calculator 53 in which a slip rate S is calculated from the following equation.

$$S=(Vd-Vg)/Vd$$

where $0 \leq S \leq 1$

The driven-wheel speeds are further applied to a reference slip rate calculator 54 for calculating a reference slip rate St. When the vehicle is steered at a large radius at high speed, the reference slip rate St is calculated in dependency on left and right driven-wheel speeds so as to reduce the slip rate. The slip rate S and the reference slip rate St are applied to a slip determining section 55. In the section 55, when the slip rate S is larger than the reference slip rate St, the slipping of the wheel is determined, and a slip determining signal Sd is produced.

The slip determining signal Sd is applied to a brake control condition determining section 56, an engine control condition determining section 60, and a brake-control OFF indicating condition determining section 62.

The brake control condition determining section 56 is further applied with the vehicle speed Vg from the calculator 52, a brake-control OFF switch signal, and a monitor signal from the engine control unit 11 for monitoring the operating condition of the engine. The monitor signal is produced when the engine is in an abnormal state, which will be described hereinafter in detail. The section 56 determines the conditions for controlling the brake whether the vehicle speed Vg is low, the brake-control OFF switch is not operated, and the engine is in a normal state. When the slip determining signal Sd is applied to the section 56 under these conditions, it is determined that the brake can be operated. The section 56 produces a brake controllable signal which is applied to a brake control section 58 and a brake signal producing section 59.

The brake control section 58 is applied with the slip rate S and the reference slip rate St and produces the brake control signal in accordance with the slip rates for properly controlling the brake through the hydraulic circuit 18. The brake signal producing section 59 produces a brake control effecting signal which is applied to the control unit 11 through the signal lead 20b.

The engine control condition determining section 60 is further applied with the brake-control OFF switch signal and the monitor signal from the engine control unit 11. The section 60 determines the condition for controlling the engine whether the brake-control OFF switch is not operated and the engine is in a normal state. When the slip determining signal Sd is applied under these conditions, the section 60 produces an engine controllable signal which is applied to a slip signal producing section 61. The section 61 produces a slip signal which is applied to the control unit 11 through the signal lead 20a.

The brake-control OFF indicating condition determining section 62 is further applied with the brake-control OFF switch signal and the monitor signal. The section 62 determines the conditions for operating a brake-control OFF indicating lamp 63 when the slip determining signal Sd is turned off, the brake-control OFF switch is operated, and the engine is in a normal state.

Figure 4A:
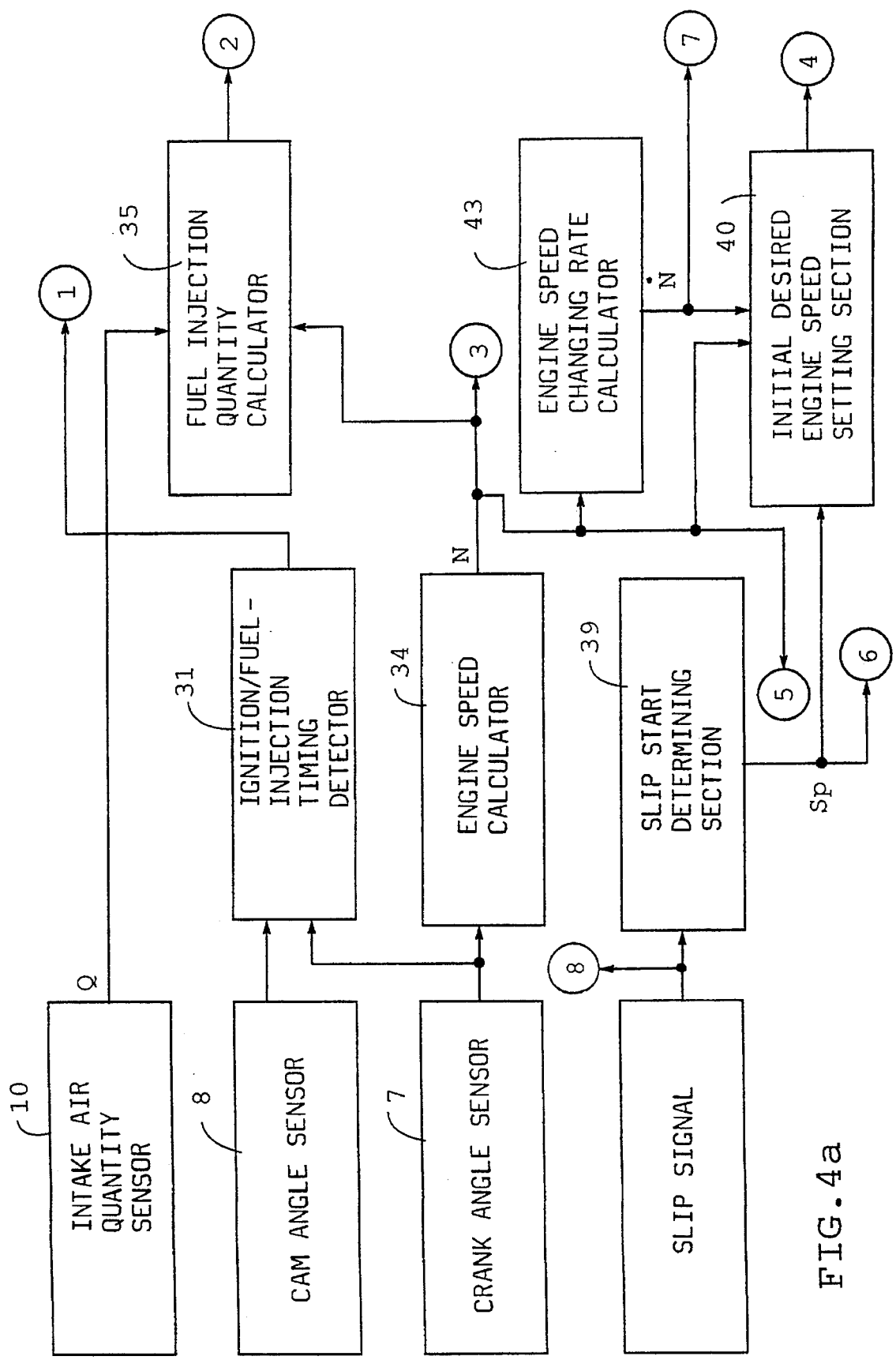
FIGS. 4a to 4c are block diagrams of an engine control unit of the present invention.
Figure 4B:
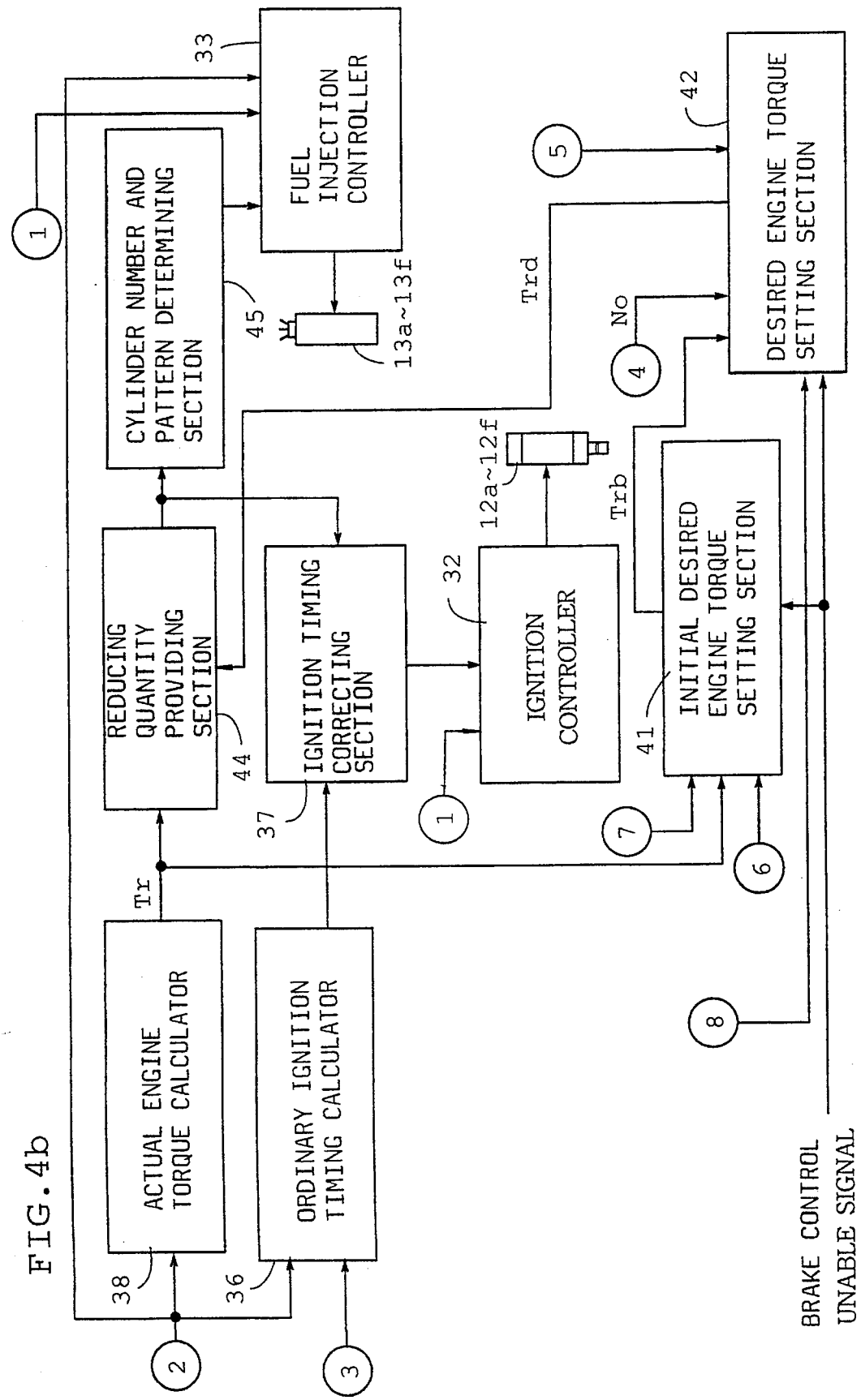
Figure 4C:
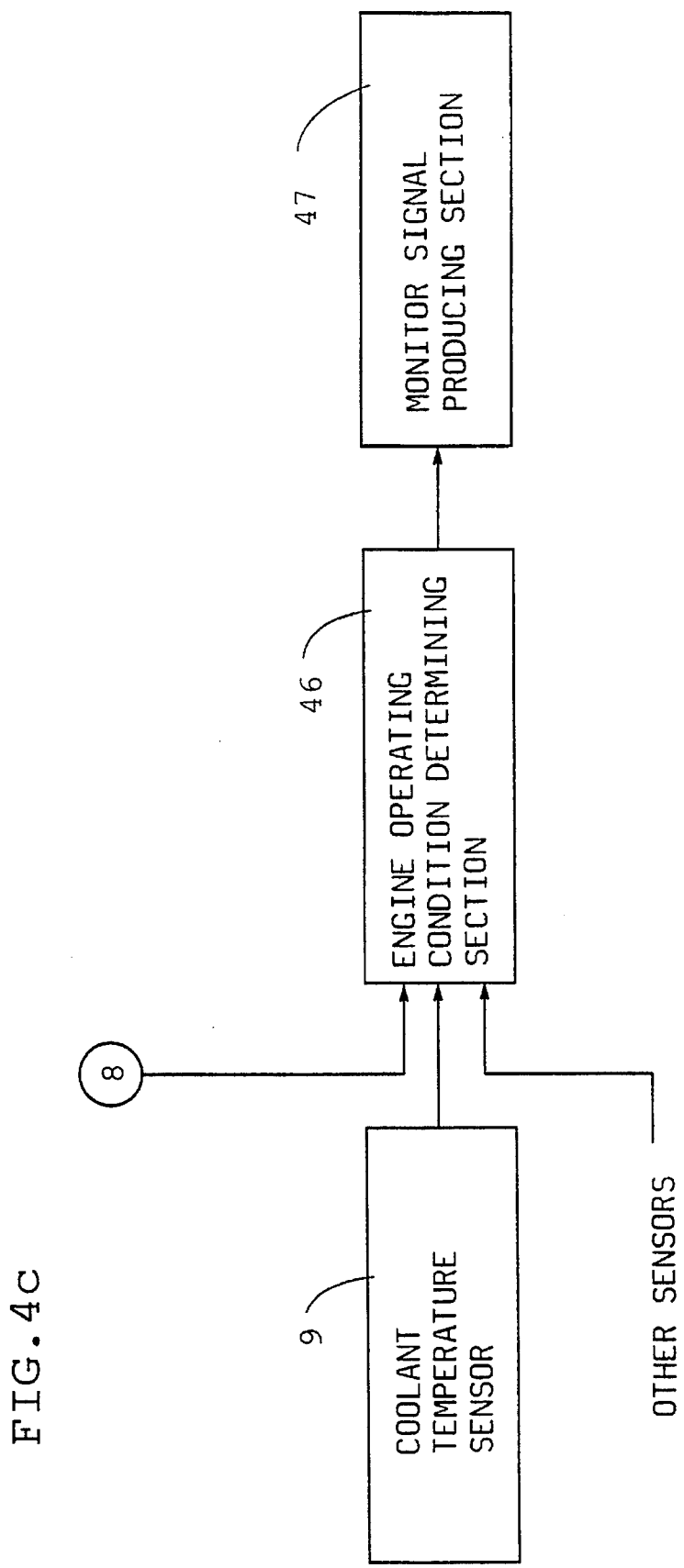

Referring to FIGS. 4a–4c showing the engine control unit 11, ignition/injection timing detector 31 is supplied with a crank angle signal, a cam angle signal from the crank angle sensor 7, the cam angle sensor 8, respectively. The detector 31 detects an ignition timing and a fuel injection timing and produces an ignition timing signal and a fuel injection timing signal. The ignition timing signal is applied to an ignition controller 32 for operating the spark plugs 12a to 12f. The fuel injection timing signal is applied to a fuel injection controller 33 for operating the fuel injectors 13a to 13f. The crank angle signal is further applied to an engine speed calculator 34 for calculating an engine speed N. The engine speed N is applied to a fuel injection quantity calculator 35 to which an intake-air quantity Q detected by the intake-air quantity sensor 10 is also applied. In the calculator 35, a fuel injection quantity Tp is calculated based on an equation $Tp=K_1Q/N$ ($K_1$ is a constant). The fuel injection quantity Tp is applied to the controller 33 and to an ordinary ignition timing calculator 36. The calculator 36 is further applied with the engine speed N and calculates an ignition timing in dependency on the engine speed N. When the engine speed is high, the ignition timing is advanced. An ordinary ignition timing is applied to the controller 32 through an ignition timing correcting section 37.

When the drive wheels slip, the slip signal is applied from the slip signal generating section 61 of the brake control unit 16 to a slip start determining section 39 of the engine control unit 11 through the lead 20a. The section 39 produces a slip start signal Sp which is applied to an initial desired engine speed setting section 40 and an initial desired engine torque setting section 41.

The engine speed N produced at the calculator 34 is fed to an engine speed changing rate calculator 43 for calculating a changing rate Ṅ of engine speed N. The engine speed changing rate Ṅ is applied to the sections 40 and 41, respectively.

The initial desired engine speed setting section 40 determines an engine speed No at an initial stage of the slipping by correcting the engine speed N with the changing rate Ṅ. The initial desired engine speed No is further applied to a desired engine torque setting section 42.

The control unit 11 is further provided with an actual engine torque calculator 38 to which the fuel injection quantity Tp produced at the calculator 35 is applied. The calculator 38 calculates an actual engine torque Tr dependent on the operation of all cylinders.

Figure 7:
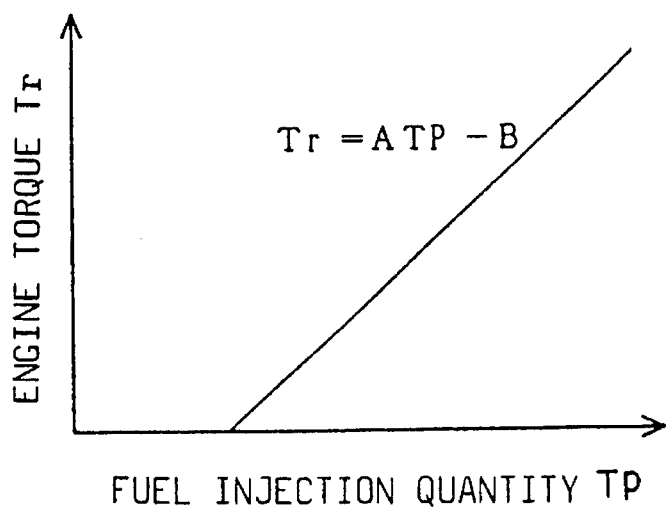
FIG. 7 is a graph showing a relationship between engine torque and fuel injection quantity.

As shown in FIG. 7, the actual engine torque Tr is in proportion to the fuel injection quantity Tp, and a linear function of the fuel injection quantity Tp is represented as $$Tr = ATp - B \text{ (A and B are constants)}$$

The actual engine torque Tr is applied to the initial desired engine torque setting section 41 in which an initial desired engine torque Trb is determined in accordance with the signals Sp, Ṅ and Tr.

Basically, if the engine torque is suppressed to the actual engine torque at the starting of slipping, a further large slipping can be prevented. However, the system is arranged to prevent the slipping more reliably as described hereinafter.

The engine torque is distributed as a torque for driving a driving system between the engine and the drive wheels and to a torque for driving the vehicle by the drive wheels. At the slipping of the wheels, the engine torque is represented as Engine torque = torque for Accelerating vehicle body + torque for Accelerating driving system.

Consequently, if the engine torque is suppressed to the accelerating torque necessary for accelerating the vehicle body, further slipping can be reliably prevented.

Since the accelerating torque of the driving system is the product of the moment of inertia J of the driving system and an angular velocity, namely the engine speed changing rate Ṅ, it is possible to obtain the accelerating torque at slipping from the moment of inertia J and the rate Ṅ. Assuming that the moment of inertia J is constant, the accelerating torque is in proportion to the changing rate Ṅ. Thus, the initial desired engine torque Trb is determined in accordance with the actual engine torque Tr and the engine speed changing rate Ṅ based on the following equation.

$$Trb = Tr - K_2 \dot{N} \text{ (where } K_2 \text{ is a constant)}$$

The initial desired engine torque Trb is applied to the desired engine torque setting section 42.

However, it is difficult to obtain exact engine torque Tr and engine speed changing rate Ṅ because of errors in measurement. In order to solve such a problem, the section 42 for determining a desired engine torque Trd is provided with a feedback control system according to the error, that is the difference between the engine speed N of the calculator 34 and the initial desired speed No. Thus, the desired engine torque Trd is determined by the following equation.

$$Trd = Trb - K_3 (N - No)$$

where $K_3$ is a feedback gain.

The desired engine torque Trd is applied to a reducing quantity providing section 44 to which the actual engine torque Tr of the section 38 is also applied. The section 44 determines a reducing quantity of the power of the engine. The reducing quantity is applied to a cylinder number and pattern determining section 45 where a cylinder reducing index number Aout is obtained.

Figure 8:
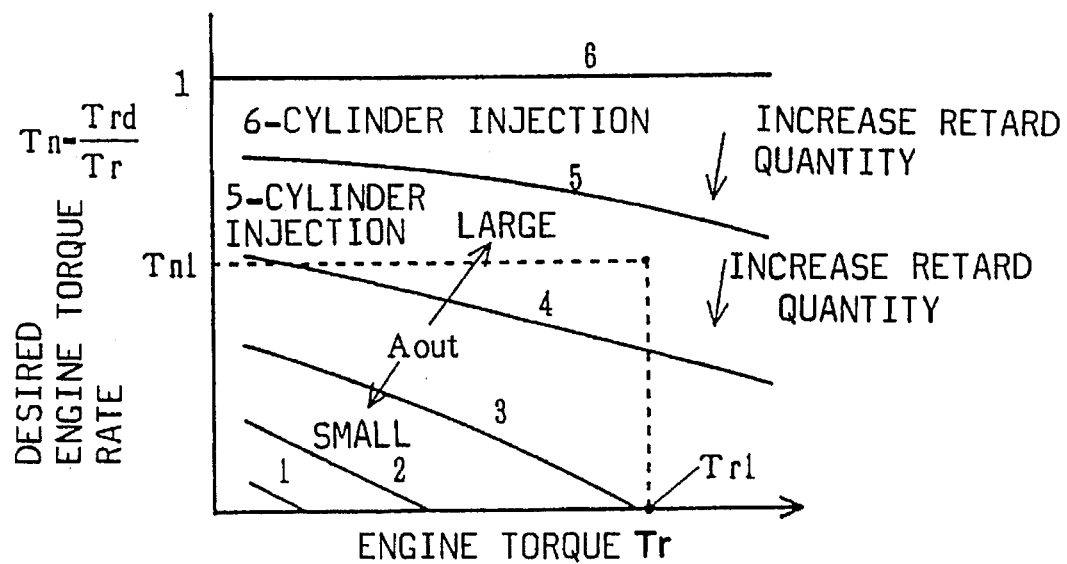
FIG. 8 is a look-up table of a reducing quantity for reducing the power of an engine.

FIG. 8 is a three dimensional map showing the cylinder reducing index number Aout. The abscissa represents the actual engine torque Tr when the six cylinders are operated. The ordinate represents a desired engine torque rate Tn (0 to 1) of the desired engine torque Trd to the actual engine torque Tr (Trd/Tr). In the six cylinder engine, the reducing index number is 0 to 6. As shown by a dotted line, when the actual engine torque Tr is Trl and the desired engine torque rate Tn is Tnl, the reducing index number is 4.8.

In the section 45, the number of the cylinders to be operated and a pattern for selecting preferable operating cylinders are determined based on the reducing index number of 4.8. In this case, five cylinders are operated. An output signal of the section 45 is applied to the fuel injection controller 33.

The reducing quantity signal is further applied to the ignition timing correcting section 37. In accordance with the reducing index number of 4.8, a correcting value of the ignition timing is determined. Namely, although the index number is 4.8, the number of cylinders is 5 which is larger by 0.2 (5−4.8= 0.2). Therefore, the engine torque must be reduced by a value corresponding to the index number 0.2. The reduction of the torque is obtained by retarding the ignition timing in accordance with 0.2. A retarded timing is applied to the controller 32. Thus, the power of the engine is reduced to cause the actual engine torque Tr to converge the desired engine torque Trd.

If the brake signal producing section 59 of the control unit 16 produces a brake control unable signal, the signal is applied to the desired engine torque setting section 42 through the signal lead 20b for changing the desired engine torque Trd to another desired engine torque Tra.

An engine operating condition determining section 46 is applied with output signals from the coolant temperature sensor 9 and the other sensors such as a knock sensor (not shown) for determining the operating conditions of the engine. When the engine is in an abnormal state, the section 46 produces an output signal which is applied to a monitor signal producing section 47. The section 47 produces the above described monitor signal which is applied to the brake control unit 16 through the lead 20c.

Further, the engine control unit 11 operates to detect the disconnections of the signal leads 20a and 20b at beginning of the operation of the system. If the disconnection is detected, a detect signal is applied to the control unit 16 through the signal lead 20c.

Figure 5A:
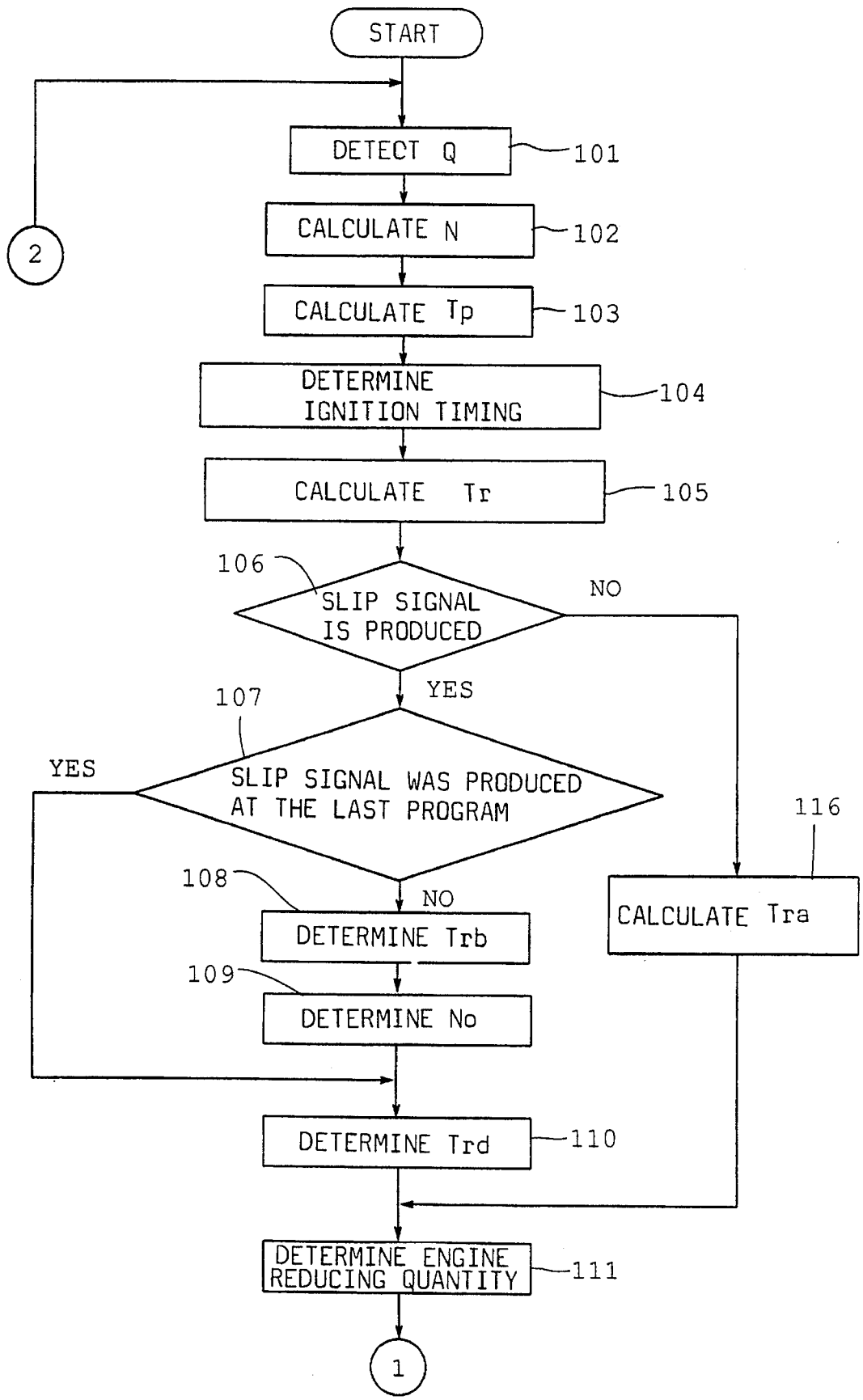
FIGS. 5a and 5b are flowcharts showing the operation of the engine control unit.
Figure 5B:
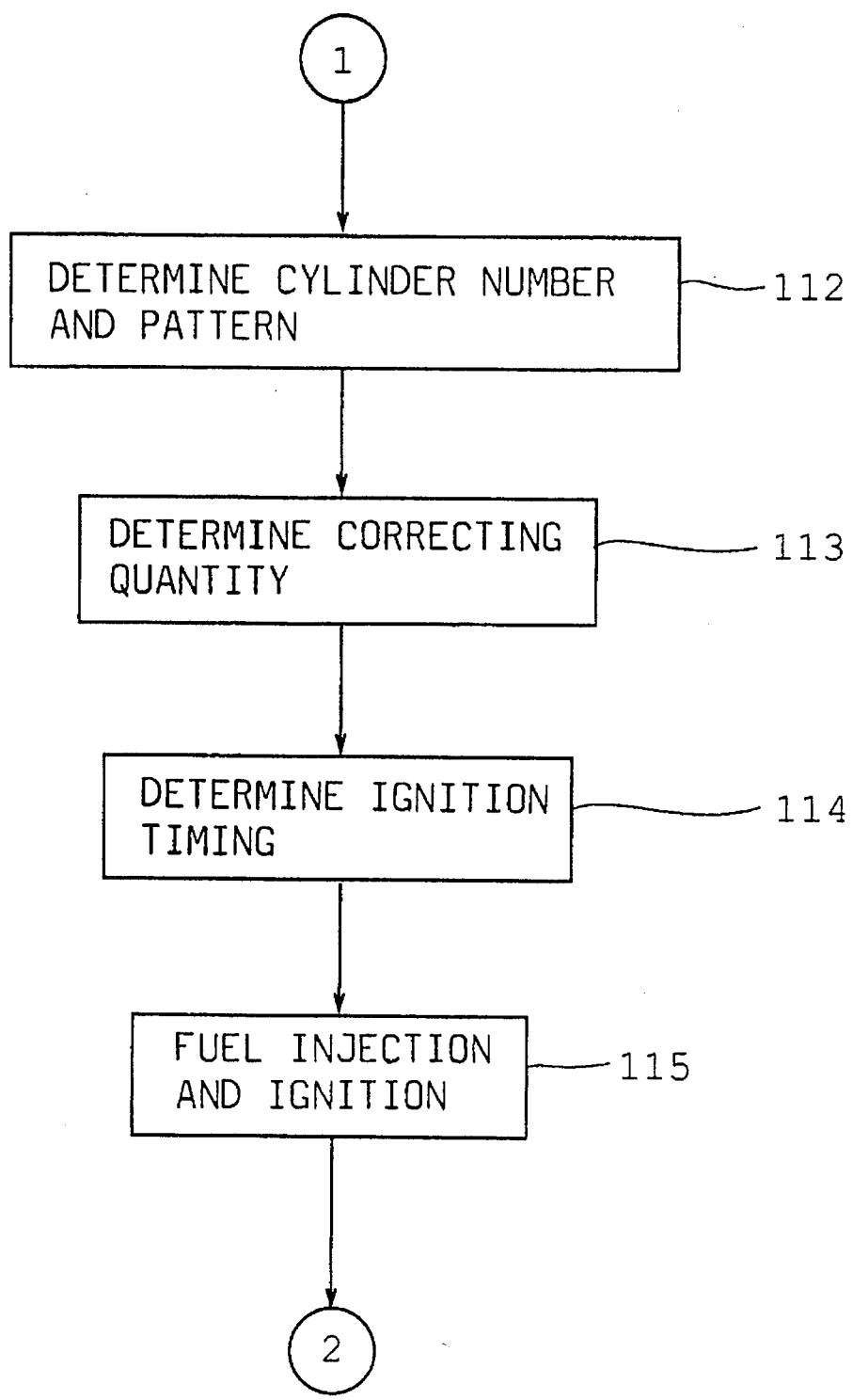

The operation of the engine control unit 11 will be described hereinafter with reference to the flowchart of FIGS. 5a, 5b.

An intake-air quantity Q is detected at a step 101, engine speed N is calculated at a step 102, and fuel injection quantity Tp is calculated at a step 103. An ignition timing is calculated at a step 104, and actual engine torque Tr is calculated at a step 105. At a step 106, it is determined whether a slip signal is produced or not. If the slip signal is produced, it is determined whether the slip signal was produced at the last program or not at a step 107. If not, namely the slip signal is produced at the instant program first, initial desired engine torque Trb is determined at a step 108. At a step 109, initial desired engine speed No is determined. At a step 110, desired engine torque Trd is determined. At a step 111, engine power reducing quantity is determined based on the index number Aout based on the desired engine torque Trd and the actual engine torque Tr. At a step 112, the number of the cylinder and a pattern of selected cylinders are determined. At a step 113, a retarding quantity for the ignition timing is determined, and an ignition timing is determined at a step 114. At a step 115, fuel injection and ignition are performed.

If the slip signal is not produced at the step 106, the program goes to a step 116 where another desired engine torque Tra is calculated, and the program goes to the step 111. The desired engine torque Tra is updated at every program by adding a predetermined increment up to a maximum value.

At the step 107, when it is determined that the slip signal is produced at the last program, the program goes to the step 110.

Figure 6A:
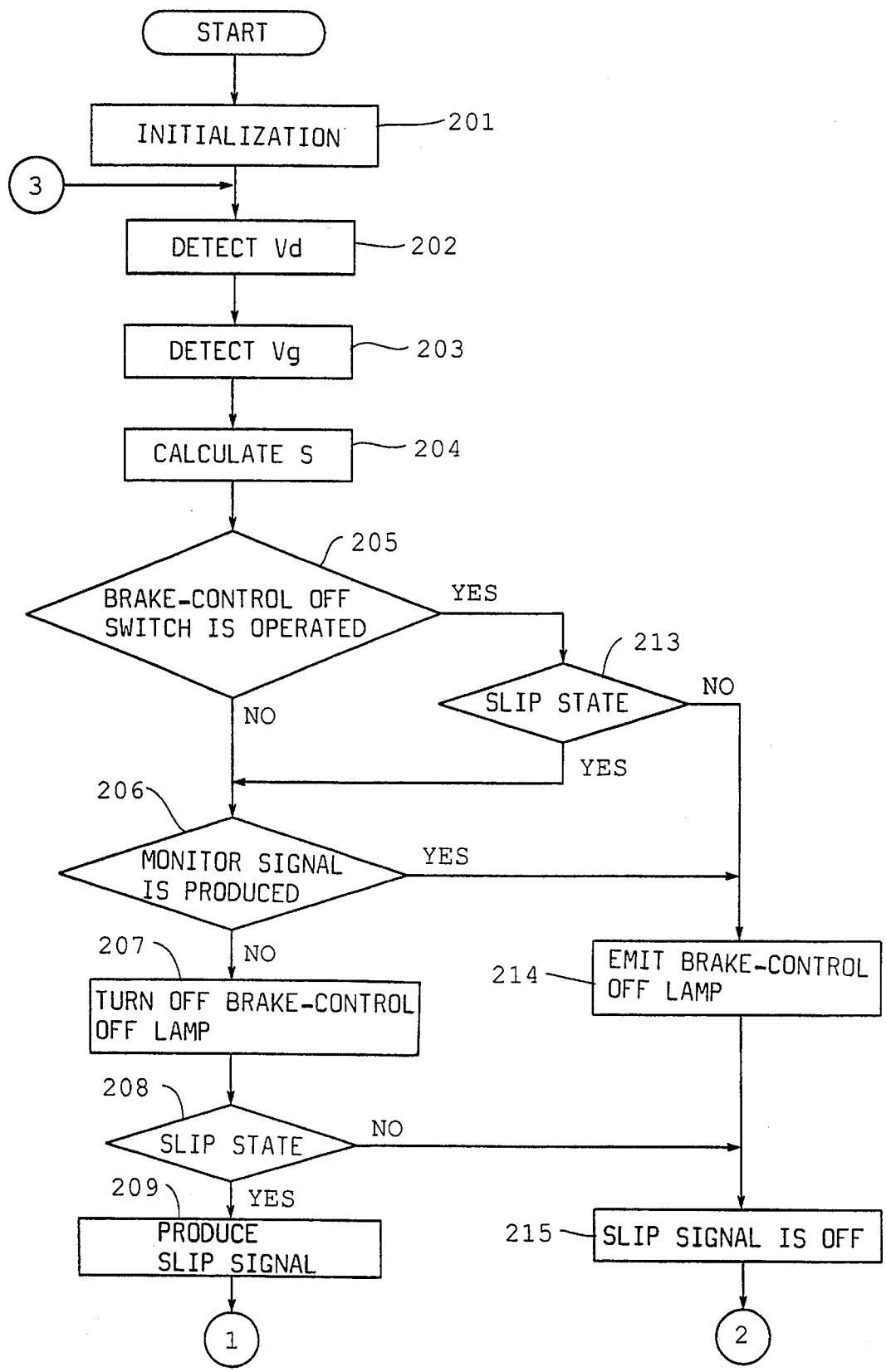
FIGS. 6a and 6b are flowcharts showing the operation of the brake control unit.
Figure 6B:
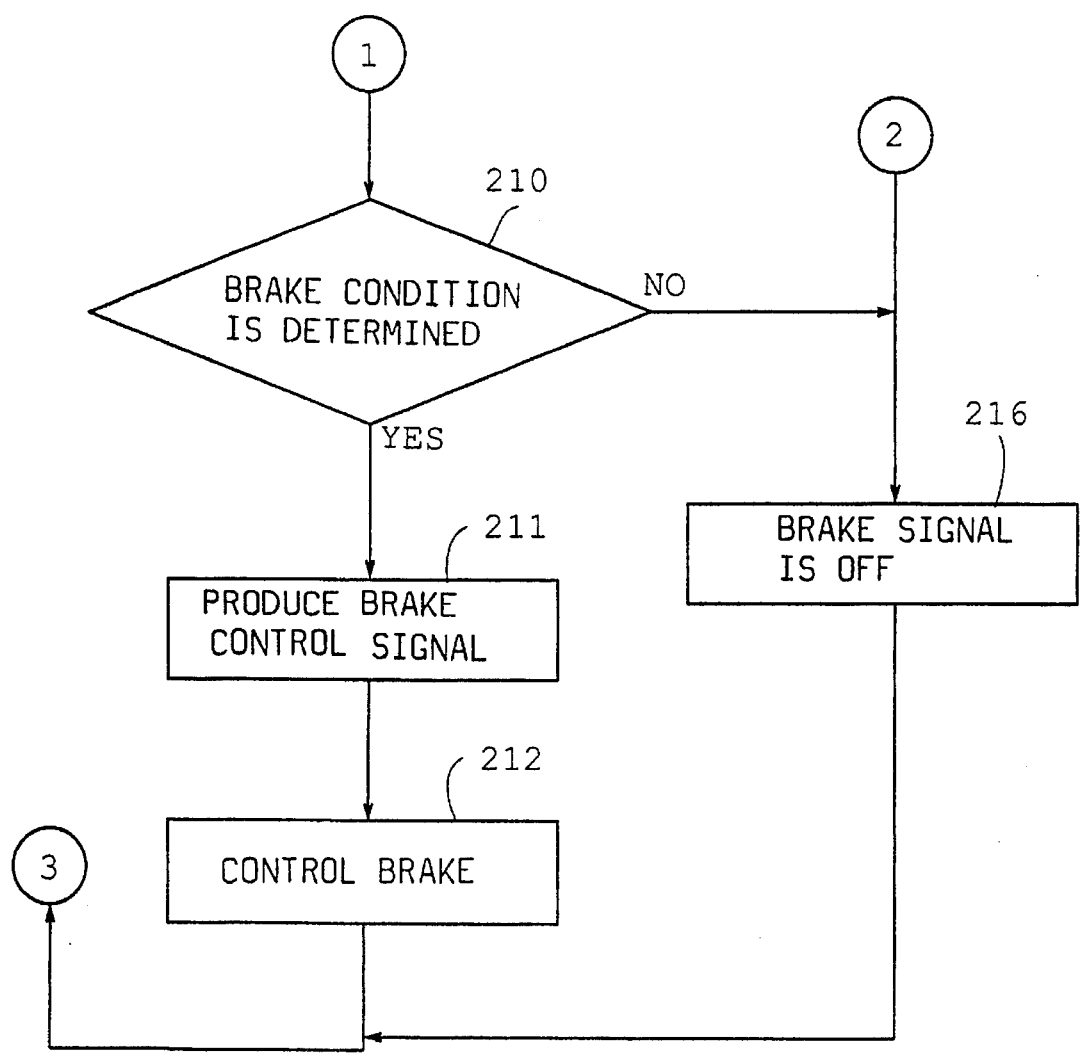

The operation of the brake control unit 16 for detecting the slipping of the wheel and for controlling the brake will be described with reference to the flowchart of FIGS. 6a, 6b.

At a step 201, all signals are initialized. At a step 202, a drive-wheel speed Vd is calculated, a vehicle speed Vg is calculated at a step 203, and a slip rate S is calculated at a step 204. At a step 205, it is determined whether the brake-control OFF switch is operated or not. If not, the program goes to a step 206 where it is determined whether the monitor signal is produced or not. If the monitor signal is not produced, namely the engine is normally operated, the brake-control OFF lamp is turned off at a step 207. It means that the brake control can be performed. At a step 208, it is determined whether the drive wheels slip or not. If yes, the slip signal is produced at a step 209. At a step 210, the condition for controlling the brake is determined. For example, if the vehicle speed is lower than a predetermined value, it is determined that the brake control condition is satisfied. The brake control signal is produced at a step 211, and brake control is effected at a step 212.

If the brake-control OFF switch is operated at the step 205, it is determined whether the drive wheels slip or not at a step 213. If the slip is determined, the program goes to the step 206. If not, the brake-control OFF lamp is emitted at a step 214. The slip signal is cut off at a step 215, and the brake signal is cut off at a step 216.

If the monitor signal is produced at the step 206, the program goes to the step 214. If the slipping condition is not determined at the step 208, the program goes to the step 215. If the brake control condition is not satisfied at the step 210, the program goes to the step 216 where the brake signal is off.

In accordance with the present invention, desired engine torque is determined in accordance with the engine torque at the beginning of slipping without using particular sensors. The power of the engine is controlled in accordance with the desired engine torque and reducing quantity. Thus, such an unnecessary engine torque as to increase the slipping is prevented.

Furthermore, the desired engine torque is corrected in accordance with the desired engine speed and the actual engine speed by the feedback control, and the engine speed is controlled to the engine speed at the beginning of slipping. Therefore, excessive slipping is suppressed to effectively distribute the power of the engine to the drive wheels.

By the feedback control of the engine speed, uncomfortable feeling during the driving of the vehicle is prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling output of an engine mounted on a motor vehicle, comprising:

means for determining actual engine speed;

wheel slipping detection means for detecting a starting of wheel slipping of the vehicle;

actual engine torque calculating means for calculating actual engine torque;

first desired engine torque setting means for setting a first desired engine torque, upon said detecting of a starting of wheel slipping, in accordance with the actual engine torque calculated by said actual engine torque calculating means at a time when said starting of wheel slipping is detected;

second desired engine torque setting means responsive to the actual engine speed and the first desired engine torque outputed by said first desired engine torque setting means for setting a second desired engine torque; and controlling means responsive to said second desired engine torque for controlling the engine such that the actual engine torque converges to said second desired engine torque during the wheel slipping.

2. The system according to claim 1, further comprising:

fuel injection means for injecting fuel to be supplied to cylinders of the engine; and fuel injection quantity providing means for providing a fuel injection quantity to be injected to each of said cylinders, and wherein said controlling means reduces a number of the cylinders to which the fuel is supplied, in order to reduce the actual engine torque.

3. The system according to claim 2, further comprising:

ignition timing providing means for providing ignition timing of the engine, and wherein said controlling means includes reducing quantity providing means for providing a cylinder reducing index number indicating a number of cylinders necessary for said desired engine torque, cylinder number determining means for determining preferable operative cylinders based on said cylinder reducing index number and ignition timing correcting means for correcting said ignition timing by a retard amount corresponding to a difference between said cylinder reducing index number and a number of said preferable operative cylinders determined by said cylinder number determining means.

4. The system according to claim 2, wherein said first desired engine torque is calculated based on said fuel injection quantity.

5. A system for controlling output of an engine mounted on a motor vehicle, comprising:

wheel slipping detection means for detecting starting of wheel slipping of the vehicle;

actual engine torque calculating means for calculating actual engine torque;

first desired engine torque setting means for setting a first desired engine torque in accordance with the actual engine torque calculated by said actual engine torque calculating means when said starting of wheel slipping is detected;

actual engine speed detecting means for detecting actual engine speed;

second desired engine torque setting means responsive to the actual engine speed and the first desired engine torque outputed by said first desired engine torque setting means for setting a second desired engine torque;

controlling means responsive to said second desired engine torque for controlling the engine such that the actual engine torque converges to said second desired engine torque;

desired engine speed setting means for setting a desired engine speed in accordance with the actual engine speed detected by said actual engine speed detecting means when condition of said wheel slipping is detected; and wherein said second desired engine torque setting means corrects said first desired engine torque in accordance with a difference between a present value of said actual engine speed and said desired engine speed thereby setting said second desired engine torque.

6. A system for controlling output of an engine mounted on a motor vehicle, comprising:

wheel slipping detection means for detecting starting of wheel slipping of the vehicle;

actual engine torque calculating means for calculating actual engine torque;

desired engine torque setting means for setting a desired engine torque in accordance with the actual engine torque calculated by said actual engine torque calculating means when said starting of wheel slipping is detected;

controlling means for controlling the engine such that the actual engine torque converges to said desired engine torque;

actual engine speed detecting means for detecting actual engine speed;

desired engine speed setting means for setting a desired engine speed in accordance with the actual engine speed detected by said actual engine speed detecting means when condition of said wheel slipping is detected;

said desired engine torque setting means corrects said desired engine torque in accordance with a difference between a present value of said actual engine speed and said desired engine speed;

engine speed changing rate calculating means for calculating a changing rate of said actual engine speed; and wherein said desired engine speed is corrected by said engine speed changing rate.

7. A system for controlling output of an engine mounted on a motor vehicle, comprising:

wheel slipping detection means for detecting starting of wheel slipping of the vehicle;

actual engine torque calculating means for calculating actual engine torque;

desired engine torque setting means for setting a desired engine torque in accordance with the actual engine torque calculated by said actual engine torque calculating means when said starting of wheel slipping is detected;

controlling means for controlling the engine such that the actual engine torque converges to said desired engine torque;

actual engine speed detecting means for detecting actual engine speed;

desired engine speed setting means for setting a desired engine speed in accordance with the actual engine speed detected by said actual engine speed detecting means when condition of said wheel slipping is detected;

said desired engine torque setting means corrects said desired engine torque in accordance with a difference between a present value of said actual engine speed and said desired engine speed;

engine speed changing rate calculating means for calculating a changing rate of said actual engine speed; and wherein said desired engine torque setting means sets an initial value of said desired engine torque based on said engine speed changing rate.

8. In a control system for an automotive engine mounted on a vehicle having, a driving wheel operatively connected to said engine for moving said vehicle, a free wheel for supporting said vehicle, a driving wheel speed sensor for detecting a driving wheel speed and for generating a driving wheel speed signal, a free wheel speed sensor for detecting a free wheel speed and generating a free wheel speed signal, slip determining means responsive to said driving and free wheel speed signals for determining an occurrence of a wheel slip by comparing a difference between both of said signals with a predetermined ratio and for generating a wheel slip signal, and an engine speed sensor for detecting engine speed and for producing an engine speed signal, an improvement of the system which comprises:

engine speed changing rate calculating means responsive to said engine speed signal for calculating a changing rate of said engine speed upon the occurrence of a slip in said driving wheel and for producing an engine speed changing rate signal;

slip start determining means responsive to said wheel slip signal for determining a start slip of said driving wheel and for generating a wheel slip start signal;

initial desired engine speed setting means responsive to said engine speed changing rate signal, said engine speed signal and said slip start signal for deriving an initial desired engine speed with correction of said engine speed in accordance with said changing rate at an initial stage of said occurrence, said initial desired engine speed setting means outputting an initial desired engine speed signal;

initial desired torque setting means responsive to said engine speed changing rate and slip start signals for setting an initial desired torque by calculation of an equation from an actual engine torque corresponding to said engine speed changing rate, said initial desired torque setting means generating an initial desired torque signal; and second desired torque setting means responsive to said initial desired engine speed signal, said slip start signal, said initial desired torque signal and said wheel slip signal for setting a desired engine torque to control said engine so as to avoid an unnecessary power increase and to effectively prevent said wheel slip.

* * * * *